(12) United States Patent
Okazaki et al.

(10) Patent No.: US 10,048,969 B2
(45) Date of Patent: Aug. 14, 2018

(54) DYNAMIC BRANCH PREDICTOR INDEXING A PLURALITY OF WEIGHT TABLES BY INSTRUCTION ADDRESS FETCH HISTORY AND MAKING A PREDICTION BASED ON A PRODUCT SUM CALCULATION OF GLOBAL HISTORY REGISTER VALUES AND OUTPUTTED WEIGHT TABLE VALUE

(71) Applicant: FUJITSU LIMITED, Kawasaki-shi, Kanagawa (JP)

(72) Inventors: Ryohei Okazaki, Kawasaki (JP); Takashi Suzuki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 184 days.

(21) Appl. No.: 15/175,388

(22) Filed: Jun. 7, 2016

(65) Prior Publication Data
US 2017/0024215 A1   Jan. 26, 2017

(30) Foreign Application Priority Data
Jul. 24, 2015   (JP) ................................ 2015-146924

(51) Int. Cl.
*G06F 9/38*    (2018.01)
*G06F 9/30*    (2018.01)
*G06F 12/0875*  (2016.01)

(52) U.S. Cl.
CPC ........ *G06F 9/3806* (2013.01); *G06F 9/30058* (2013.01); *G06F 9/3844* (2013.01); *G06F 12/0875* (2013.01); *G06F 2212/452* (2013.01)

(58) Field of Classification Search
CPC .............................. G06F 9/3844; G06F 9/3848
See application file for complete search history.

(56) References Cited

U.S. PATENT DOCUMENTS

| 9,652,245 B2 * | 5/2017 | Hilton ................... G06F 9/3844 |
| 2008/0148028 A1 * | 6/2008 | Grandou ............... G06F 9/3806 |
| | | 712/238 |

(Continued)

FOREIGN PATENT DOCUMENTS

| JP | 06-089173 | 3/1994 |
| JP | 2009-037305 | 2/2009 |

OTHER PUBLICATIONS

Renee St. Amant, Daniel A. Jimenez, Doug Burger. "Low-Power, High-Performance Analog Neural Branch Prediction" 41st IEEE/ACM International Symposium on Microarchitecture, Nov. 8-12, 2008. (Year: 2008).*

(Continued)

*Primary Examiner* — Jacob Petranek
(74) *Attorney, Agent, or Firm* — Fujitsu Patent Center

(57) ABSTRACT

A processor includes: an instruction execution unit that executes an instruction; and a branch prediction unit that stores history information indicating every instruction fetches performed a certain number of times before an instruction fetch of a branch prediction target instruction whether the instruction predicted as branch-taken is included and weight tables including weights corresponding to instructions and predicts the branch prediction target instruction to be taken or not-taken. The branch prediction unit, before the instruction fetch of the branch prediction target instruction, obtains the history information and the weights related to the instruction fetches performed the certain number of times to perform a product-sum operation, and at the time of the instruction fetch of the branch prediction target instruction, performs an operation of a result of the product-sum operation and a weight of the branch prediction target instruction to perform branch prediction.

7 Claims, 9 Drawing Sheets

(56) References Cited

U.S. PATENT DOCUMENTS

| | | | | |
|---|---|---|---|---|
| 2010/0332812 A1* | 12/2010 | Burger | ................. | G06F 9/3844 712/239 |
| 2011/0087866 A1* | 4/2011 | Shah | ................. | G06F 9/383 712/239 |
| 2015/0363203 A1* | 12/2015 | Lipasti | ................. | G06F 9/3806 712/240 |

OTHER PUBLICATIONS

Zihao Zhou, Mayank Kejriwal, and Risto Miikkulainen. "Extended Scaled Neural Predictor for Improved Branch Prediction" The 2013 International Joint Conference on Neural Networks, Aug. 4-9, 2013. (Year: 2013).*

Anthony S. Fong and C. Y. Ho. "Global/Local Hashed Perceptron Branch Prediction." Fifth International Conference on Information Technology: New Generations, Apr. 7-9, 2008. (Year: 2008).*

C. Y. Ho and Anthony S. S. Fong "Combining Local and Global History Hashing in Perceptron Branch Prediction" 6th IEEE/ACIS International Conference on Computer and Information Science (ICIS 2007) (Year: 2007).*

Yasuyuki Ninomiya, Koki Abe. "A3PBP: A Path Traced Perceptron Branch Predictor Using Local History for Weight Selection" Journal of Instruction-Level Parallelism 9 (2007) 1-18 (Year: 2007).*

S. McFarling, "Combining Branch Predictors", Western Research Laboratory Technical Note TN-36, Jun. 1993 (29 pages).

D. A. Jimenez et al., "Dynamic Branch Prediction with Perceptrons", In Proceedings of the 7th International Symposium on High Performance Computer Architecture (HPCA-7), Jan. 2001 (10 pages).

D. A. Jimenez, "Piecewise Linear Branch Prediction", In Proceedings of the 32nd Annual International Symposium on Computer Architecture (ISCA-32), Jun. 2005 (12 pages).

D. A. Jimenez, "OH-SNAP: Optimized Hybrid Scaled Neural Analog Predictor", In Proceedings of the 3rd Championship on Branch Prediction, <http://www.jilp.org/jwac-2/> 2011 (4 pages).

* cited by examiner

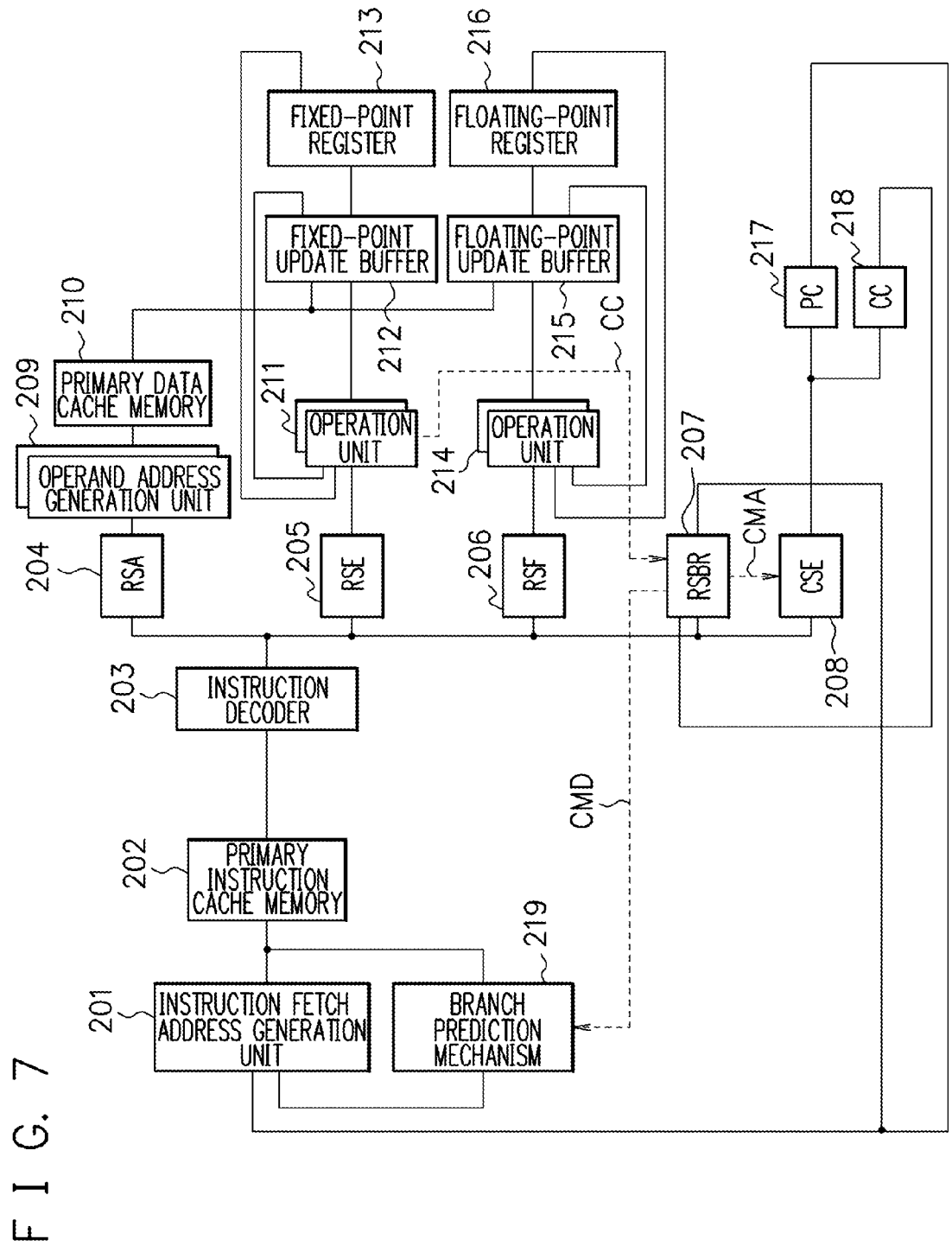
F I G. 7

F I G. 9A
| IFC1 | IA | IT/BT | IX/BX | IM/BM | IB | IR | | |
| IFC2 | | IA | IT/BT | IX/BX | IM/BM | IB | IR | |
| IFC3 | | | IA | IT/BT | IX/BX | IM/BM | IB | IR |
| IFC4 | | | | IA | IT/BT | IX/BX | IM/BM | IB | IR |
⋮
F I G. 9B
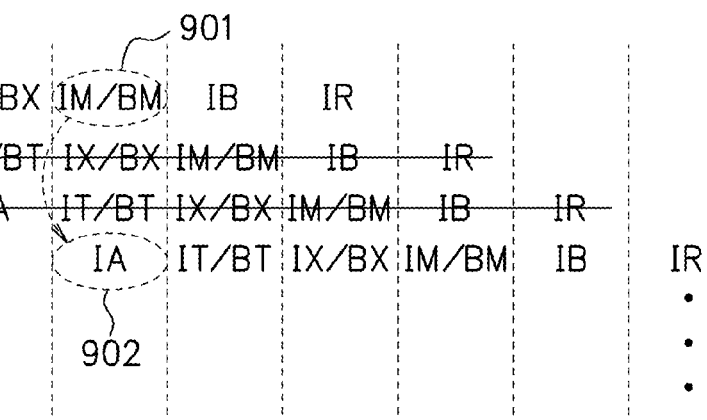

F I G. 10
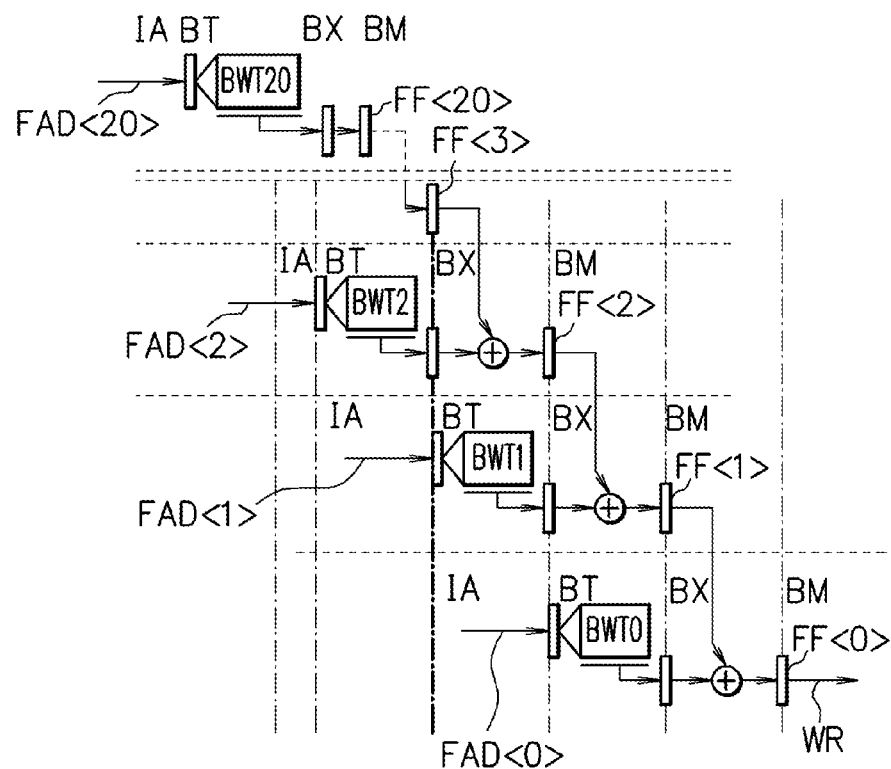
F I G. 11
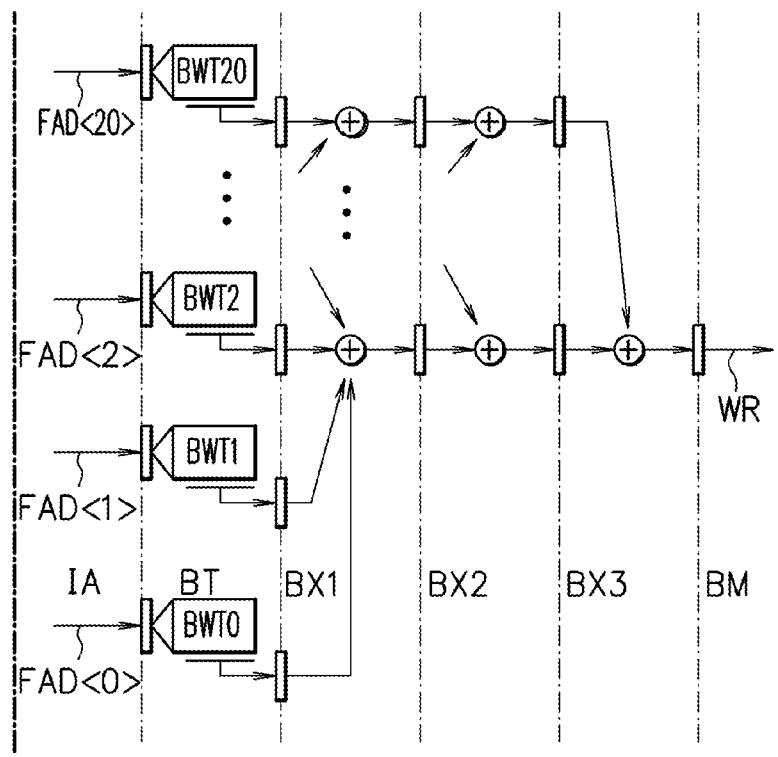

DYNAMIC BRANCH PREDICTOR INDEXING A PLURALITY OF WEIGHT TABLES BY INSTRUCTION ADDRESS FETCH HISTORY AND MAKING A PREDICTION BASED ON A PRODUCT SUM CALCULATION OF GLOBAL HISTORY REGISTER VALUES AND OUTPUTTED WEIGHT TABLE VALUE

CROSS-REFERENCE TO RELATED APPLICATION

This application is based upon and claims the benefit of priority of the prior Japanese Patent Application No. 2015-146924, filed on Jul. 24, 2015, the entire contents of which are incorporated herein by reference.

FIELD

The embodiments discussed herein are directed to a processor and a control method of a processor.

BACKGROUND

A processor including a pipeline is designed to, when an instruction to execute is a branch instruction, cause a branch prediction mechanism to predict whether the branch instruction is taken or not taken and advance processing forward. When the branch prediction fails, the processor cancels all the processings executing precedingly based on the result of the branch prediction and re-execute another processing, resulting in performance loss. Therefore, an accuracy improvement of the branch prediction is important for the purpose of achieving a performance improvement of the processor.

As a first form of the branch prediction mechanism, there is the following branch prediction method. In the first method, the branch prediction mechanism holds branch destination addresses (target addresses) of branch instructions that were taken in the past as a branch history. The branch prediction mechanism searches the branch history using an instruction fetch address as an index in parallel with fetching (reading) of an instruction, to thereby predict a success or failure of branch (branch-taken or branch-not-taken) and a branch destination address (for example, Patent Document 1). In the first method, it is possible to nearly eliminate useless instruction fetches when a branch is taken because the time until decision of the branch destination prediction is short. However, there is no information corresponding to an instruction sequence flow in the branch prediction, resulting in low branch prediction accuracy.

As a second method of the branch prediction mechanism, there is a branch prediction method called g-share (for example, Non-Patent Document 1). In the second method, the branch prediction mechanism holds branch-taken accuracy and branch destination addresses of branch instructions as a branch history. When deciding a fetched instruction as a conditional branch instruction, the branch prediction mechanism uses the exclusive logical sum of a global history in which success or failure of recent branches is written in chronological order and instruction fetch addresses as an index to search the history of branch-taken accuracy, to thereby decide whether success or failure of a branch to predict a branch destination address. The second method makes it possible to obtain higher branch prediction accuracy than the first method of just searching the history of branch destinations.

In the second method, as the global history in which success or failure of branches is written in chronological order becomes longer in length, branch prediction performance is improved. However, the length of the global history relies on the size of the history of branch-taken accuracy, so that the size of the history of branch-taken accuracy becomes double in order to increase the length of the global history by one bit. Therefore, it is not easy to increase the length of the global history and the mounting area cost for the accuracy improvement of branch prediction obtained by expansion of the branch history is large.

As a third method of the branch prediction mechanism, there is a branch prediction method called perceptron (for example, Non-Patent Document 2). In the third method, the branch prediction mechanism performs branch prediction based on association between success or failure of a branch of a branch prediction target instruction and success or failure of a branch of an instruction fetched before the branch prediction target instruction. The branch prediction mechanism stores the association with the branch prediction target instruction in a weight table as a weight value. The branch prediction mechanism performs branch prediction based on a result obtained by making a weight value obtained by searching the weight table using a fetch address of the branch prediction target instruction as an index and a global history correspond to each other to be subjected to a product-sum operation.

Concretely, the branch prediction mechanism performs a product-sum operation of a result obtained by multiplying a weight $W(i)$, i being a natural number of $1 \leq i \leq n$, of a previous i-th instruction from the branch prediction target instruction and a global history $X(i)$ where a value of "+1" is written when a branch of the previous i-th instruction is taken and a value of "−1" is written when a branch of the previous i-th instruction is not taken together $(W(0)+W(1) \times X(1)+W(2) \times X(2)+ \ldots +W(n) \times X(n))$. Then, the branch prediction mechanism predicts branch-taken in a case where the result of the product-sum operation is positive and predicts branch-not-taken in a case where the result of the product-sum operation is negative.

In the third method, the length of the global history relies on the number of weight tables, and in order to increase the length of the global history by one bit, it is only necessary to increase the weight table by one. When the size of the weight table is sufficiently small, the mounting area cost caused by an increase in the global history is reduced compared to the second method. However, in the third method, by referring to the weight table using address of the branch prediction target instruction, weights are obtained, and the result of adding these weights together is used as a branch prediction result. Time is taken for this processing, to thus need to extend a latency of branch prediction and reduce an operating frequency.

As a forth method of the branch prediction mechanism, there is a branch prediction method called piecewise-linear (for example, Non-Patent Documents 3, 4). The forth method can improve the branch prediction accuracy by using an instruction execution path to a branch prediction target instruction for branch prediction based on the third method. Concretely, the branch prediction mechanism performs a search for an index of a weight table of a previous i-th instruction from a branch prediction target instruction using a fetch address of the previous i-th instruction, to thereby reflect the instruction execution path in the branch prediction.

Further, the following branch prediction technique is proposed. The branch prediction mechanism performs prediction processing by pipelines of two stages of stage 1 and stage 0. By the pipeline of the stage 1, the branch prediction mechanism performs weighting on each branch result of a global history by a weight selected from a weight table and performs a product-sum operation of the global history and the weight, to thereby calculate a product-sum operation value of weighted branch results. By the pipeline of the stage 0, the branch prediction mechanism calculates a prediction value using the product-sum operation value of the weighted branch results. The branch prediction mechanism performs the processing of the stage 0 using the result of processing of the stage 1 performed when the previous branch instruction is input (for example, Patent Document 2).

[Patent Document 1] Japanese Laid-open Patent Publication No. 06-89173

[Patent Document 2] Japanese Laid-open Patent Publication 2009-37305

[Non-Patent Document 1] S. McFarling, "Combining Branch Predictors", Western Research Laboratory Technical Note TN-36, June 1993.

[Non-patent Document 2] D. A. Jimenez and C. Lin, "Dynamic branch prediction with perceptrons", In Proceedings of the 7th International Symposium on High Performance Computer Architecture (HPCA-7), p.197-206, January 2001.

[Non-Patent Document 3] D. A. Jimenez, "Piecewise linear branch prediction", In Proceedings of the 32nd Annual International Symposium on Computer Architecture (ISCA-32), June 2005.

[Non-Patent Document 4] D. A. Jimenez, "Oh-snap: Optimized hybrid scaled neural analog predictor", In Proceedings of the 3rd Championship on Branch Prediction, http://www.jilp.org/jwac-2/, 2011.

In the branch prediction by the above-described piecewise-linear branch prediction method, high accuracy of the branch prediction is obtained, but as will be described later, the amount of circuits in the branch prediction mechanism becomes huge and the latency of branch prediction increases.

SUMMARY

An aspect of a processor includes: an instruction execution unit that executes an instruction; and a branch prediction unit that predicts a branch prediction target instruction to be branch-taken or branch-not-taken. The branch prediction unit stores history information indicating every instruction fetches performed a certain number of times before an instruction fetch of the branch prediction target instruction whether the instruction predicted as branch-taken is included and weight tables including weights corresponding to instructions to be obtained by search using indexes based on addresses of the instruction fetches. The branch prediction unit, before the instruction fetch of the branch prediction target instruction is performed, obtains the history information and the weights related to the instruction fetches performed the certain number of times to perform a weight product-sum operation, and at the time of the instruction fetch of the branch prediction target instruction, performs an operation of a result obtained by the weight product-sum operation and a weight of the branch prediction target instruction to perform branch prediction of the branch prediction target instruction.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7 is a diagram illustrating a configuration example of a processor in a second embodiment;

FIG. 9A and FIG. 9B are diagrams for explaining pipelines related to instruction fetches and the branch prediction mechanism in this embodiment;

FIG. 10 is a diagram illustrating an example of branch prediction processing by a piecewise-linear branch prediction method; and FIG. 11 is a diagram illustrating another example of the branch prediction processing by the piecewise-linear branch prediction method.

DESCRIPTION OF EMBODIMENTS

Figure 1:
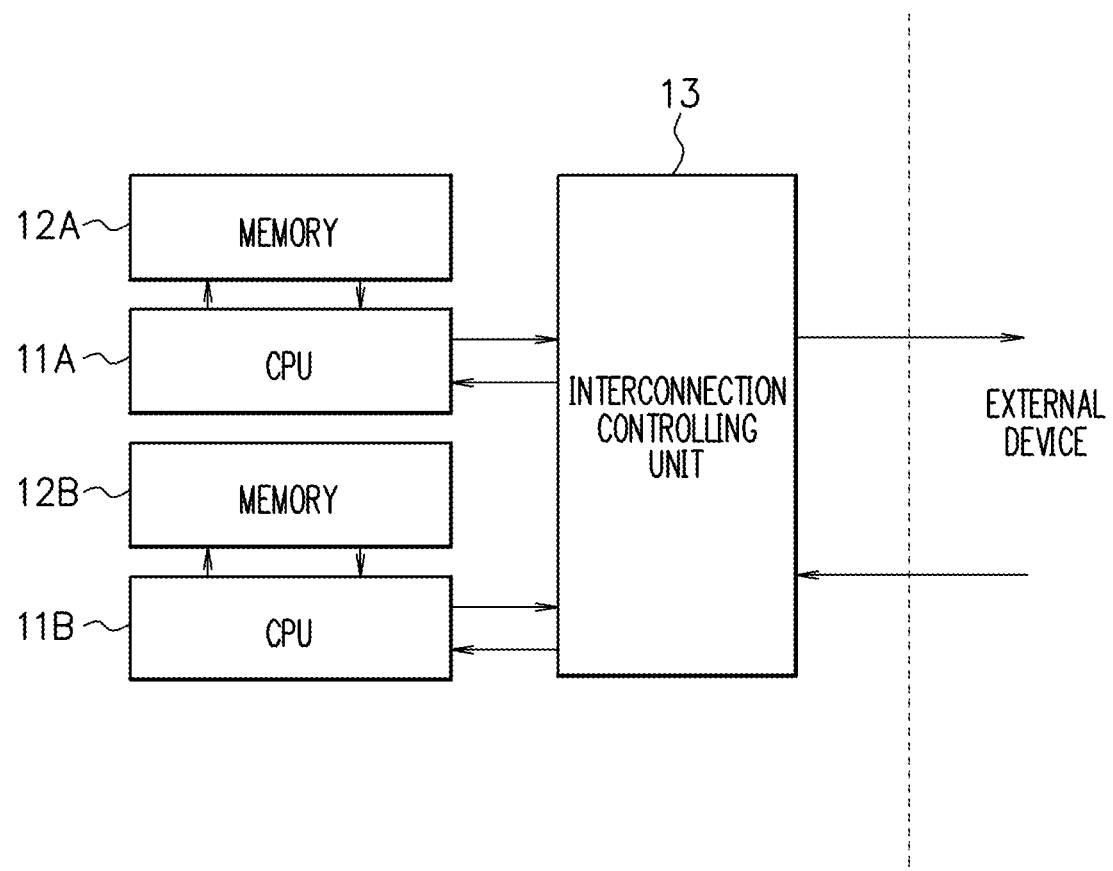
FIG. 1 is a diagram illustrating a configuration example of an information processing system in an embodiment.

Hereinafter, there will be explained embodiments based on the drawings. In the embodiments, a branch prediction mechanism performs branch prediction of a branch instruction by a piecewise-linear branch prediction method.

There is explained pipelines related to instruction fetches and a branch prediction mechanism in the embodiments. FIG. 9A and FIG. 9B are diagrams for explaining pipelines related to instruction fetches and a branch prediction mechanism in this embodiment. As illustrated in FIG. 9A and FIG. 9B, an instruction fetch is pipelined into an Instruction fetch Address (IA) cycle, an Instruction fetch Translation Lookaside Buffer (TLB) access (IX) cycle, an Instruction fetch eXecution of TLB read (IX) cycle, an Instruction fetch TLB tag Match (IM) cycle, an Instruction fetch Buffer (IB) cycle, and an Instruction fetch Result (IR) cycle in this embodiment.

The IA cycle is a cycle to determine an instruction fetch address to send it to a primary cache memory. The IA cycle is also a cycle to send the instruction fetch address to the branch prediction mechanism. The IT cycle is a cycle to access a translation lookaside buffer (TLB). The IX cycle is one cycle for reading the TLB. The IM cycle is a match cycle of a tag of the TLB. The IB cycle is a buffer cycle for sending an instruction to an instruction control unit from the primary cache memory. The IR cycle is a cycle to receive the instruction in the instruction control unit and check exceptions or the like in an instruction fetch phase associated with the instruction.

In parallel with the processing that the instruction fetch is pipelined to be executed sequentially, the branch prediction mechanism is pipelined to execute the branch prediction. The branch prediction mechanism receives the instruction fetch address in the IA cycle. Upon receipt of the instruction fetch address, the branch prediction mechanism searches a memory (RAM) of the branch prediction mechanism in the Branch prediction weight Table access (BT) cycle and the Branch prediction weight eXecution (BX) cycle and outputs a predicted branch destination of the branch instruction in the Branch prediction's memory tag Match (BM) cycle. The branch prediction mechanism searches a weight table in the BT cycle, performs a weight operation in the BX cycle, and completes the prediction of branch-taken (TAKEN) or branch-not-taken (NOT_TAKEN) in the BM cycle. The BM cycle in which the branch prediction is completed in the branch prediction mechanism and the IM cycle of the instruction fetch agree with each other in terms of timing.

As for the pipelined instruction fetch, the instruction fetch address is sequentially incremented by a certain size basically. For example, each instruction fetch address of sequential instruction fetches IFC1, IFC2, IFC3, and IFC4 illustrated in FIG. 9A becomes one in which a fetch line size is added to an instruction fetch address of a previous instruction fetch. Until the BM cycle in which the result of branch prediction is decided, the instruction fetch address is incremented sequentially and speculative instruction fetches are performed.

When the branch prediction mechanism predicts branch-taken in the BM cycle, the sequential instruction fetches that have been executed speculatively are cancelled. For example, as illustrated in FIG. 9B, when the instruction to be fetched in the instruction fetch IFC1 is predicted as branch-taken, the instruction fetches IFC2 and IFC3 are being speculatively executed until the BM cycle 901 where the result of the branch prediction is decided to be cancelled in the BM cycle 901 of the instruction fetch IFC1. In the IA cycle 902 of the instruction fetch IFC4, a branch destination address predicted at the time of the instruction fetch IFC1 is determined as an instruction fetch address. That is, the instruction fetch IFC4 is performed using the branch destination address predicted at the time of the instruction fetch IFC1.

Here, the following methods are considered as a method of achieving the branch prediction by the piecewise-linear branch prediction method.

(First Branch Prediction Method)

An operation of a weight of a previous i-th instruction from a branch prediction target instruction and a product-sum operation result of weights of instructions until a previous (i+1)-th instruction from the branch prediction target instruction is performed when an instruction fetch of the previous i-th instruction, and the result of the operation is propagated to the next cycle. When an instruction fetch of a previous (i−1)-th instruction from the branch prediction target instruction, an operation of a weight of the previous (i−1)-th instruction and the product-sum operation result of the weights of the instructions until the previous i-th instruction that is propagated from the previous cycle is performed, and the result of the operation is propagated to the next cycle. The above is performed repeatedly, to thereby achieve a weight product-sum operation of the branch prediction target instruction.

In the first branch prediction method, when the instruction fetch of the branch prediction target instruction is performed, the product-sum operation result of the weights used for the branch prediction can be obtained only by performing addition of two inputs of the product-sum operation result of the weights of the instructions until the previous 1st instruction from the branch prediction target instruction and the weight of the branch prediction target instruction. Therefore, it is possible to hide a latency taken for the weight product-sum operation and achieve the latency of the branch prediction as one cycle, so that it is possible to achieve a performance improvement of the processor achieved by an accuracy improvement of the branch prediction without deteriorating the performance of instruction fetches. It is possible to reduce the amount of operations executed for one cycle and it is suitable also for an increase in frequency of the processor.

However, the first branch prediction method needs a storage circuit such as a flip-flop for propagating an intermediate result of the weight product-sum operation to the next cycle in each weight table. The circuit amount of the storage circuits for propagating intermediate results of the weight product-sum operation results in a non-negligible amount in terms of the mounting cost and power consumption in such a case that the length of a global history is extended, parallelism of the weight operation is increased, and further the storage circuits are mounted on a processor in a simultaneous multi tread (SMT) system that performs an instruction fetch of a thread different in each cycle.

There is illustrated an example of branch prediction processing by the first branch prediction method in FIG. 10. In the example illustrated in FIG. 10, the instruction fetch is pipelined into the IA cycle, the IT cycle, the IX cycle, the IM cycle, the IB cycle, and the IR cycle. The branch prediction processing receives an instruction fetch address decided in the IA cycle and is also pipelined into the BT cycle, the BX cycle, and the BM cycle, and the result of branch prediction is decided in the BM cycle.

In this example, the length of a global history of a branch history to be referred to is set to 20. When branch prediction is performed in a certain instruction fetch, whether an instruction predicted as branch-taken is included in instruction fetches performed 20 times before the certain instruction fetch is used as the global history. In the global history, an element of one bit is allocated to one instruction fetch, and when the instruction predicted as branch-taken is included, the element corresponding to the instruction fetch is set to "1".

In the branch prediction processing by the first branch prediction method illustrated in FIG. 10, when a previous 20th instruction fetch from the instruction fetch of the branch prediction target instruction is performed, with an instruction fetch address (FAD<20>) at that time, a 20th branch weight table (BWT20) for a fetch line of the previous 20th instruction fetch is searched. Then, a weight obtained from the branch weight table (BWT20) is stored in a storage circuit such as a flip-flop (FF<20>).

Thereafter, when a previous 19th instruction fetch from the instruction fetch of the branch prediction target instruction is performed as well, with an instruction fetch address (FAD<19>) at that time, a 19th branch weight table (BWT19) is searched similarly. Then, an intermediate result obtained by adding the weight obtained from the branch weight table (BWT20), which is stored in the storage circuit (FF<20>), to a weight obtained from the branch weight table (BWT19) is stored in a storage circuit (FF<19>).

Thereafter, when a previous 18th instruction fetch from the instruction fetch of the branch prediction target instruction is performed as well, with an instruction fetch address (FAD<18>) at that time, an 18th branch weight table (BWT18) is searched similarly. Then, in a storage circuit (FF<18>), there is stored an intermediate result obtained by adding the intermediate result obtained by adding the weight obtained from the branch weight table (BWT20) and the weight obtained from the branch weight table (BWT19) together, which is stored in the storage circuit (FF<19>), to a weight obtained from the branch weight table (BWT18).

This is performed repeatedly, and when a previous 2nd instruction fetch from the instruction fetch of the branch prediction target instruction is performed, with an instruction fetch address (FAD<2>) at that time, a 2nd branch weight table (BWT2) is searched. Then, in a storage circuit (FF<2>), there is stored an intermediate result obtained by adding a product-sum operation result of the weights obtained from the branch weight table (BWT20) to a branch weight table (BWT3) respectively, which is stored in a storage circuit (FF<3>), to a weight obtained from the branch weight table (BWT2).

Thereafter, when a previous 1st instruction fetch from the instruction fetch of the branch prediction target instruction is performed, with an instruction fetch address (FAD<1>) at that time, a 1st branch weight table (BWT1) is searched. Then, in a storage circuit (FF<1>), there is stored an intermediate result obtained by adding a product-sum operation result of the weights obtained from the branch weight table (BWT20) to the branch weight table (BWT2) respectively, which is stored in the storage circuit (FF<2>), to a weight obtained from the branch weight table (BWT1).

This makes it possible to obtain a product-sum operation result of the weights obtained from the branch weight table (BWT20) to the branch weight table (BWT1) respectively when performing the instruction fetch of the branch prediction target instruction. Therefore, when the branch prediction of the branch prediction target instruction is performed, a branch prediction result (WR) can be obtained only adding the value stored in the storage circuit (FF<1>) and a weight of the branch prediction target instruction obtained by searching a branch weight table (BWT0) with an instruction fetch address (FAD<0>) together, resulting in that the latency of the branch prediction is shortened. On the other hand, the storage circuits for propagating the intermediate results of the weight product-sum operation, which are equivalent to the branch weight tables, are provided, so that the amount of circuits increases and the mounting cost increases.

(Second Branch Prediction Method)

A weight product-sum operation in branch prediction is executed over several cycles from an instruction fetch of a branch prediction target instruction. The second branch prediction method can drastically reduce the amount of storage circuits for propagating the intermediate results of the weight product-sum operation compared to the first branch prediction method, and is suitable for miniaturization of a processor core and for power saving of the processor. However, in the second branch prediction method, the operation time of the weight product-sum operations in the branch prediction is reflected in the latency of the branch prediction as it is, resulting in an increase in the latency of the branch prediction.

There is illustrated an example of branch prediction processing by the second branch prediction method in FIG. 11. In the example illustrated in FIG. 11, the instruction fetch is pipelined into the IA cycle, the IT cycle, the IX cycle, the IM cycle, the IB cycle, and the IR cycle. The branch prediction processing is performed upon receipt of an instruction fetch address decided in the IA cycle.

In this example, the length of a global history of a branch history to be referred to is set to 20. When branch prediction is performed in a certain instruction fetch, whether an instruction predicted as branch-taken is included in instruction fetches performed 20 times before the certain instruction fetch is used as the global history. In the global history, an element of one bit is allocated to one instruction fetch, and when the instruction predicted as branch-taken is included, the element corresponding to the instruction fetch is set to "1".

In the branch prediction processing by the second branch prediction method illustrated in FIG. 11, instruction fetch addresses (FAD<20> to FAD<1>) of instruction fetches performed 20 times before the instruction fetch of the branch prediction target instruction are stored. Then, when the instruction fetch of the branch prediction target instruction is performed, all branch weight tables (BWT20 to BWT0) are simultaneously searched with corresponding instruction fetch addresses (FAD<20> to <FAD<0>) respectively, and weights obtained from the respective branch weight tables (BWT20 to BWT0) are added together to be set as a branch prediction result (WR).

In the second branch prediction method, all the branch weight tables are searched simultaneously and the calculation is performed, so that as the storage circuit where the intermediate result of the weight product-sum operation is stored, storage circuits in large amounts equivalent to the length of the global history do not need to be provided, resulting in that it is possible to suppress an increase in the amount of circuits and suppress an increase in the mounting cost. On the other hand, much time is needed for the addition of the weights equivalent to the length of the global history, so that it is necessary to divide the operation of the weight product-sum operation into several cycles for the purpose of achieving an increase in frequency of the processor. In the example illustrated in FIG. 11, the operation of the weight product-sum operation is performed over three cycles (BX1, BX2, and BX3). In the second branch prediction method, the latency of the branch prediction increases as above.

In the embodiments to be explained below, the increase in the latency of the branch prediction is suppressed based on the previously described second branch prediction method. In the second branch prediction method, when the instruction fetch of the branch prediction target instruction is performed, all the branch weight tables used for the branch prediction are searched and the product-sum operation of the weights obtained from the respective branch weight tables is performed, and therefore, the operation time of the weight product-sum operation is reflected in the latency of the branch prediction as it is.

In this embodiment, among branch weight tables used for branch prediction, all the branch weight tables excluding the branch weight table that is searched for an instruction fetch address of the branch prediction target instruction as an index are searched previously before performing the instruction fetch of the branch prediction target instruction, and a weight product-sum operation is executed. This previous search of the branch weight tables is performed from the timing of an instruction fetch before cycles necessary for the addition of the weights obtained from the respective branch weight tables. Therefore, when the branch weight table is searched with the instruction fetch address of the branch prediction target instruction, the product-sum operation result of the weights of the instructions of the past is already calculated. Then, when the instruction fetch of the branch prediction target instruction is performed, the weight product-sum operation result used for the branch prediction is obtained only by adding two inputs of the product-sum operation result of the weights obtained by the previous search and the weight of the branch prediction target instruction.

This makes it possible to hide the latency taken for the weight product-sum operation and achieve the latency of the branch prediction from the instruction fetch of the branch prediction target instruction until obtaining the branch prediction result as one cycle, and therefore it is possible to achieve a performance improvement of the processor achieved by an accuracy improvement of the branch prediction without deteriorating the performance of instruction fetches. It is not necessary to include the storage circuits equivalent to the length of the global history as the storage circuit for propagating the intermediate result of the weight product-sum operation, resulting in that it is possible to suppress an increase in the amount of circuits and suppress an increase in the mounting cost.

(First Embodiment)

There is explained a first embodiment.

FIG. 1 is a diagram illustrating a configuration example of an information processing system including processors (CPUs: Central Processing Units) in this embodiment. The information processing system illustrated in FIG. 1 includes: a plurality of processors (CPUs) 11A and 11B; memories 12A and 12B; and an interconnection controlling unit 13 performing input-output controls with an external device, for example.

Figure 2:
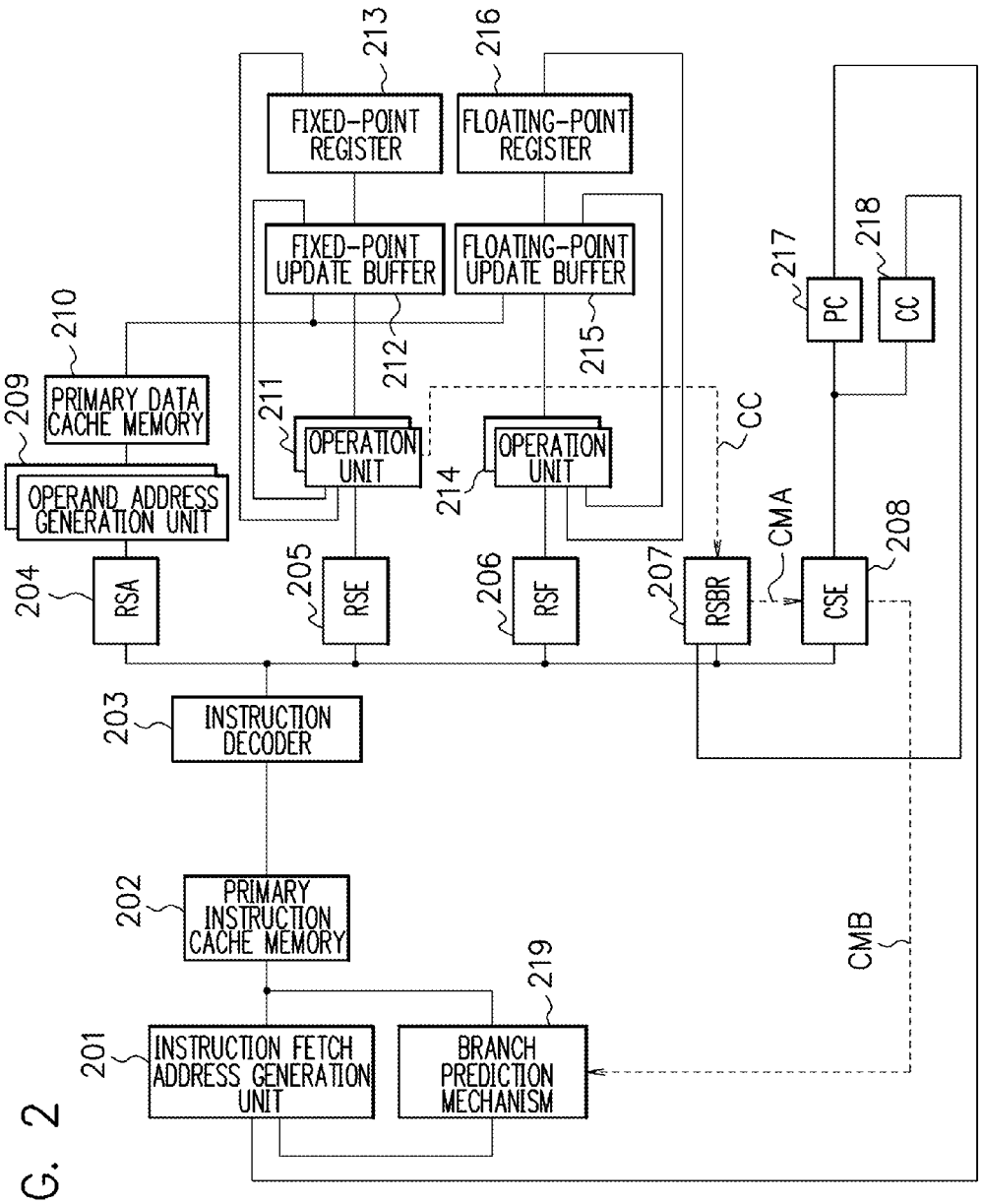
FIG. 2 is a diagram illustrating a configuration example of a processor in a first embodiment.

FIG. 2 is a diagram illustrating a configuration example of the processor in the first embodiment. The configuration example of a superscalar processor as one example is illustrated in FIG. 2, but the processor in this embodiment is not limited to the processor illustrated in FIG. 2. Instructions fetched from a primary instruction cache memory 202 in accordance with instruction fetch addresses generated in an instruction fetch address generation unit 201 are decoded in an instruction decoder 203 in the order of instructions to be accumulated in storages in a queue structure called a reservation station.

The reservation stations are prepared with respect to each instruction type such as a reservation station for address generation of a load instruction and a store instruction (RSA: Reservation Station for Address generation) 204, a reservation station for fixed-point operation (RSE: Reservation Station for Execution) 205, a reservation station for floating-point operation (RSF: Reservation Station for Floating point) 206, and a reservation station for branch instruction (RSBR: Reservation Station for BRanch) 207. Respective instructions stored in the reservation stations 204 to 207 are each executed out-of-order in the order in which the instruction is ready for instruction execution.

In accordance with the load instruction or the store instruction applied from the RSA 204, an address is generated by an operand address generation unit 209 and an access to a primary data cache memory 210 is executed. In accordance with a fixed-point operation instruction applied from the RSE 205, a fixed-point operation is executed by an operation unit 211, a fixed-point update buffer 212, and a fixed-point register 213. In accordance with a floating-point operation instruction applied from the RSF 206, a floating-point operation is executed by an operation unit 214, a floating-point update buffer 215, and a floating-point register 216. The RSBR 207 performs various controls after branch is decided.

In the meantime, to the instructions decoded by the instruction decoder 203, an instruction identification (IID) is allocated in the order of the instructions, and the decoded instructions are sent to a commit stack entry (CSE) 208 where commit processing is executed in the order of the instructions. The commit stack entry 208 is divided into a storage in a queue structure where the instructions decoded by the instruction decoder 203 are accumulated in the execution order of the instructions and a commit processing circuit where commit processing is executed based on queue information and completion reports from respective processing pipelines.

The instructions decoded by the instruction decoder 203 are accumulated in a queue of the commit stack entry 208 and wait for an instruction processing completion report. Completion reports of the instructions executed out-of-order in the respective reservation stations 204 to 207 are sent to the commit stack entry 208, and in accordance with the original execution order of a program, the instruction corresponding to the completion report among the instructions which are accumulated in the queue is committed and an update of resources is performed. By the commit stack entry 208, a program counter 217 and a condition code register 218 are updated.

A branch prediction mechanism 219 receives the instruction fetch address output from the instruction fetch address generation unit 201 and executes branch prediction in parallel with the instruction fetch. The branch prediction mechanism 219 performs the branch prediction based on the received instruction fetch address and returns a prediction result of a branch direction indicating branch-taken or branch-not-taken and a branch destination address to the instruction fetch address generation unit 201. When the predicted branch direction is branch-taken, the instruction fetch address generation unit 201 selects the branch destination address predicted by the branch prediction mechanism 219 as the next instruction fetch address.

Figure 3:
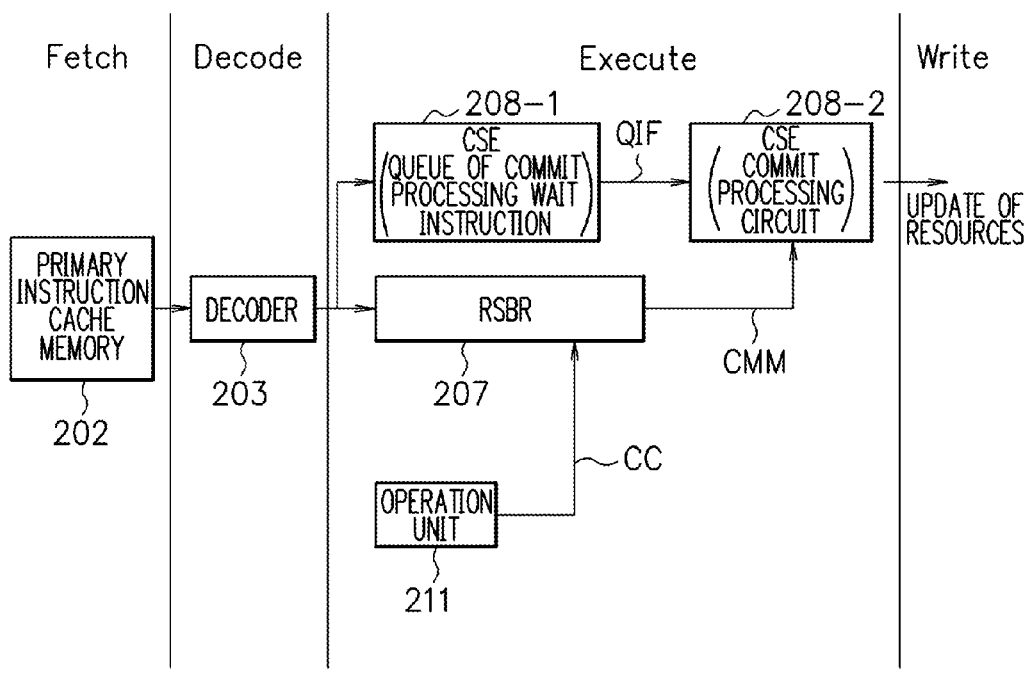
FIG. 3 is a diagram illustrating a processing example of a conditional branch instruction by the processor in the first embodiment.

There is illustrated a processing example of a conditional branch instruction by the processor in the first embodiment in FIG. 3. The instruction fetched from the primary instruction cache memory 202 and decoded to be a branch instruction by the instruction decoder 203 is stored in the RSBR 207 and waits to be a branch decidable state.

The conditional branch instruction is decided as branch-taken or branch-not-taken by a value of a register called a condition code (CC). Therefore, unless processing of an immediately before condition code change instruction is completed in the operation unit 211, branch of the subsequent conditional branch instruction is not decided. The condition code register 218 is updated when the condition code change instruction is committed, but time is taken when branch decision is performed in the RSBR 207 after the condition code register 218 is updated. Thus, in this embodiment, the condition code calculated in the operation unit 211 is directly sent to the RSBR 207 and the branch decision is performed in the RSBR 207. As for an unconditional branch instruction, no condition code is needed, so that the RSBR 207 decides branch alone.

When a branch decidable state is brought, the RSBR 207 performs the branch decision and sends a completion report and information CMM (CMA) for the update of resources to the commit stack entry 208-2. The commit stack entry 208-1, being a circuit where a queue of a commit processing wait instruction is accumulated, sends queue information QIF to the commit stack entry 208-2. The commit stack entry 208-2 receives the report and the information from the RSBR 207 and the commit stack entry 208-1 to perform commit processing and performs a resource update.

When the branch prediction fails, all the processings after the branch instruction, which are being executed speculatively, are cancelled from the pipelines and an instruction fetch is newly performed with a correct branch destination address. In the first embodiment, when the instruction that has failed in the branch prediction becomes the top of queues (TOQ) of a commit processing wait instruction in the commit stack entry 208, the instruction is committed and resources such as the program counter are updated. At the same time, all the operations on the pipelines at that time are being executed speculatively based on the false branch prediction, so that these are all cancelled and from the updated program counter (correct branch destination address), an instruction fetch is newly performed. After the branch prediction mechanism 219 receives information CMB of the committed instruction from the commit stack entry 208, an information update of the branch prediction mechanism 219 is performed based on the information CMB.

Figure 4:
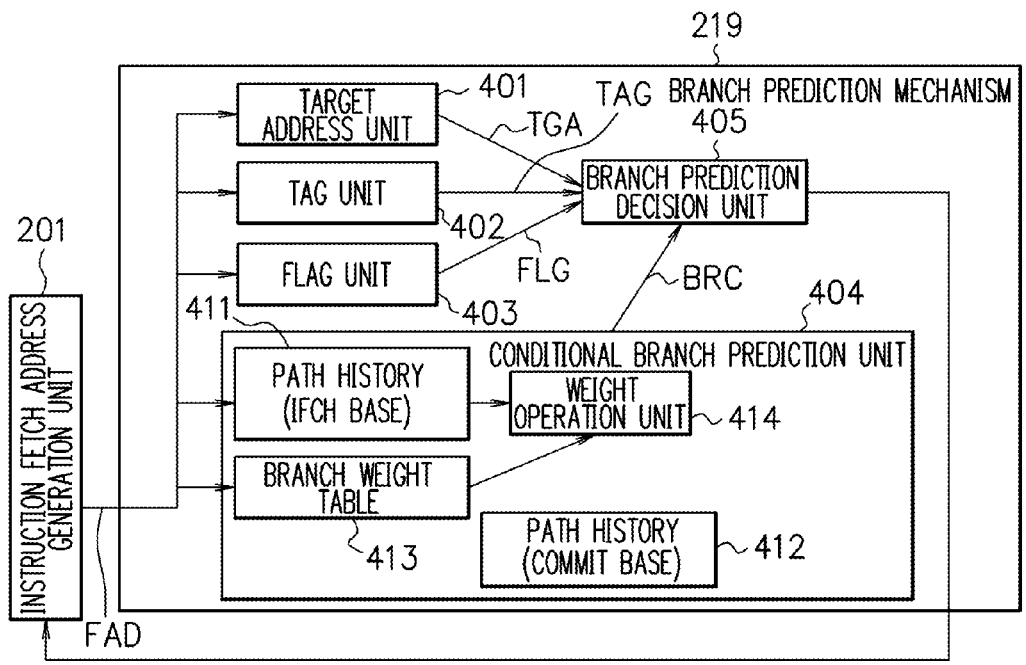
FIG. 4 is a diagram illustrating a configuration example of a branch prediction mechanism in the first embodiment.

FIG. 4 is a diagram illustrating a configuration example of the branch prediction mechanism 219 in the first embodiment. The branch prediction mechanism 219 includes: a target address unit 401; a tag unit 402; a flag unit 403; a conditional branch prediction unit 404; and a branch prediction decision unit 405. The target address unit 401 stores branch destination addresses therein. The tag unit 402 stores tags therein. The flag unit 403 stores flags (being conditional branch and the like) of a branch instruction therein.

The conditional branch prediction unit 404 decides whether a branch of the conditional branch instruction is taken or not taken. The conditional branch prediction unit 404 is a piecewise-linear branch predictor, for example. The branch prediction decision unit 405 performs final branch prediction decision from various pieces of information and sends a branch prediction result to the instruction fetch address generation unit 201. In this embodiment, the conditional branch prediction unit is fabricated by the piecewise-linear branch predictor.

When the branch prediction is performed, an instruction fetch address FAD of a branch prediction target instruction is supplied to the branch prediction mechanism 219 from the instruction fetch address generation unit 201. Upon receipt of the instruction fetch address FAD of the branch prediction target instruction, the branch prediction mechanism 219 searches the target address unit 401 where branch destination addresses are stored using a part of the instruction fetch address FAD as an index to output a branch destination address TGA at which the branch prediction target instruction is predicted as branch-taken.

At the same time, the branch prediction mechanism 219 searches the tag unit 402 where tags are stored using the same index to obtain a tag TAG. The tag TAG is bits that are not used as the index in the instruction fetch address FAD, for example, and the tag TAG obtained by the search and a part of the address of the branch prediction target instruction, which is not used as the index, are made to match each other to make a tag match. At the same time, the branch prediction mechanism 219 searches the flag unit 403 where flags are stored using the same index to obtain a flag FLG. The flag FLG is information indicating whether or not a instruction is a conditional branch instruction, or the like, for example.

At the same time, a part of the instruction fetch address FAD is sent to the conditional branch prediction unit 404, and upon receipt of the address, the conditional branch prediction unit 404 predicts whether the branch prediction target instruction is branch-taken or branch-not-taken. The conditional branch prediction unit 404 includes: a path history (instruction fetch: IFCH base) 411; a path history (commit base) 412; a branch weight table 413; and a weight operation unit 414. Details of operations of respective blocks and flows of signals of the conditional branch prediction unit 404 will be described later.

The output of the branch prediction result in the branch prediction mechanism 219 is performed as follows, for example. The following decisions are performed by the branch prediction decision unit 405 based on pieces of information from the respective units. The branch prediction decision unit 405 decides whether the tag TAG obtained by searching the tag unit 402 is matched. When the tag TAG is not matched, the conditional branch prediction unit 404 does not perform branch prediction and outputs branch-not-taken as the branch prediction result of the branch prediction mechanism 219.

When the tag TAG is matched, the branch prediction decision unit 405 changes processing by the flag FLG obtained from the flag unit 403. When the instruction is found to be an unconditional branch instruction by the flag FLG obtained from the flag unit 403, the branch prediction decision unit 405 sets a branch prediction result as branch-taken without considering information from the conditional branch prediction unit 404 and returns the branch destination address TGA obtained from the target address unit 401 to the instruction fetch address generation unit 201. Upon receipt of it, the instruction fetch address generation unit 201 restarts an instruction fetch from the received branch destination address.

When the tag TAG is matched and the instruction is found to be a conditional branch instruction by the flag FLG obtained from the flag unit 403, the branch prediction decision unit 405 decides whether to perform branch based on information of branch-taken or branch-not-taken from the conditional branch prediction unit 404. When the prediction of branch-taken is output from the conditional branch prediction unit 404, the branch prediction decision unit 405 returns the branch destination address TGA obtained from the target address unit 401 to the instruction fetch address generation unit 201. Upon receipt of it, the instruction fetch address generation unit 201 restarts an instruction fetch from the received branch destination address.

Figure 5:
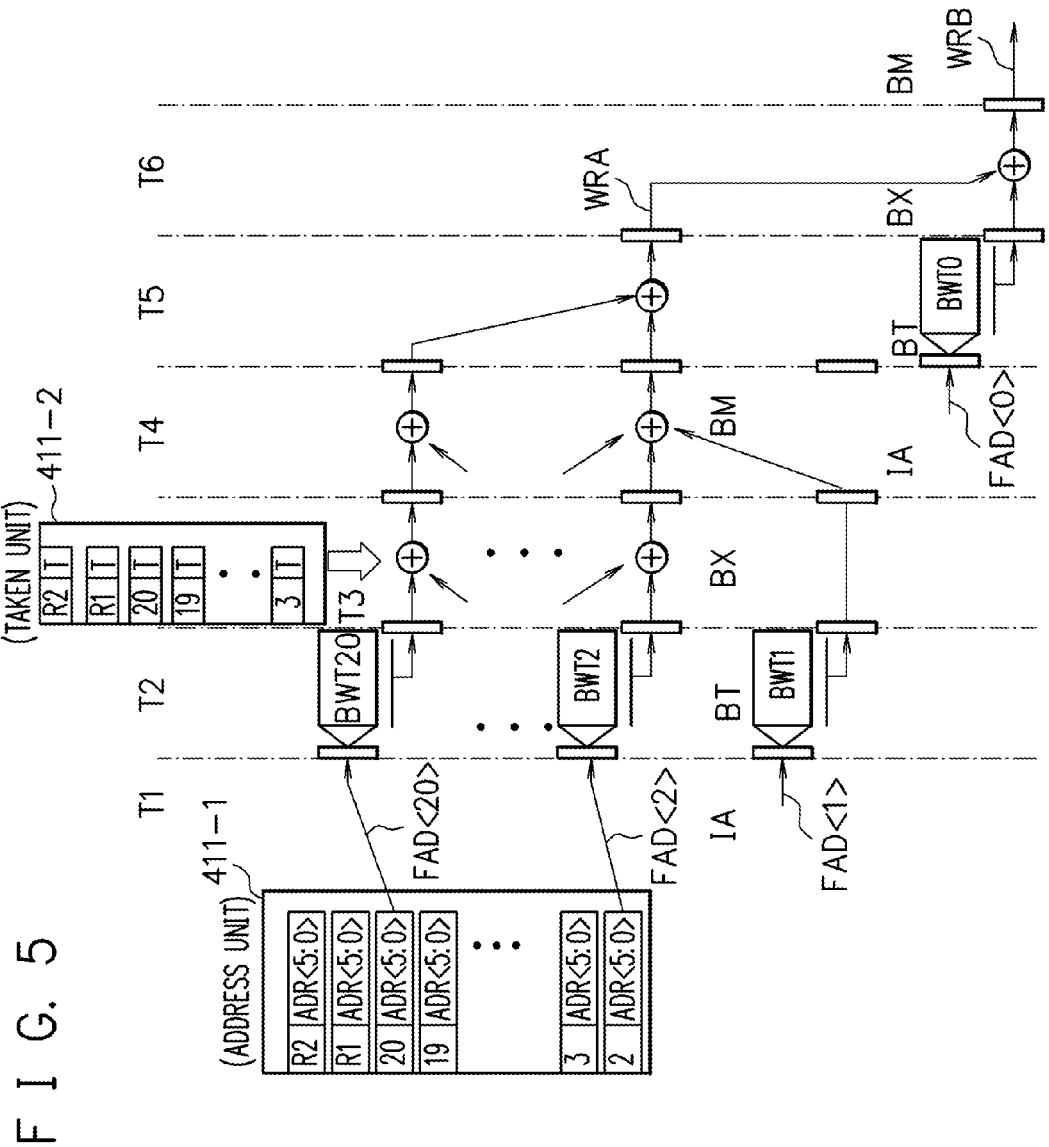
FIG. 5 is a diagram for explaining branch prediction processing in the first embodiment.

FIG. 5 is a diagram for explaining branch prediction processing by the conditional branch prediction unit 404 in the first embodiment. In the example illustrated in FIG. 5, an instruction fetch is pipelined into the IA cycle, the IT cycle, the IX cycle, the IM cycle, the IB cycle, and the IR cycle, and the branch prediction processing is performed upon receipt of an instruction fetch address decided in the IA cycle.

The length of a global history of a branch history to be referred to at the time of branch prediction is set to 20. When branch prediction is performed in a certain instruction fetch, whether an instruction predicted as branch-taken is included in instruction fetches performed 20 times before the certain instruction fetch is used as the global history register. In the global history register, an element of one bit is allocated to one instruction fetch, and when the instruction predicted as branch-taken is included, the element corresponding the instruction fetch is set to "1".

Here, it is set that three cycles are taken for addition of weights of twenty instructions in this embodiment to be explained below. In this case, instruction fetches previous 3rd or more previously instruction fetches from the instruction fetch of the branch prediction target instruction is made to be reflected in the branch prediction in this embodiment. Thus, instruction fetch addresses of the instruction fetches from a previous 23th instruction fetch to a previous 3rd instruction fetch from the instruction fetch of the branch prediction target instruction are stored. And before three cycles when the instruction fetch of the branch prediction target instruction is performed, branch weight tables (BWT20 to BWT1) are searched with the corresponding addresses to obtain weights, and the weights are added together over three cycles. Even with the instruction fetch address of the branch prediction target instruction, a branch weight table (BWT0) is searched, and a result (WRA) of the addition of the weights obtained from the branch weight tables (BWT20 to BWT1) and a weight obtained from the branch weight table (BWT0) are added together to obtain a branch prediction result (WRB).

In this embodiment, an instruction fetch address of an instruction fetch immediately before the instruction fetch of the branch prediction target instruction is not used for branch prediction. In the example illustrated in FIG. 5, addresses of two instruction fetches immediately before the instruction fetch of the branch prediction target instruction is not used for branch prediction. However, if the branch prediction result of a previous 3rd instruction fetch from the instruction fetch of the branch prediction target instruction is branch-taken, the immediately after two instruction fetches are cancelled. This is because the branch prediction is decided as branch-taken after a plurality of cycles (three cycles in the example illustrated in FIG. 5) since the IA cycle where the instruction fetch address is decided and sequential instruction fetches are performed until it is predicted as branch-taken. If it is predicted as branch-taken, sequential instruction fetches applied speculatively thereafter are invalid.

Similarly, if the branch prediction result of a previous 1st instruction fetch from the instruction fetch of the branch prediction target instruction is branch-taken, the instruction fetch of the branch prediction target instruction is a sequential instruction fetch performed immediately thereafter, to thus be invalid at the point of prediction as branch-taken. In the example illustrated in FIG. 5, the branch prediction result is decided after three cycles since the IA cycle, and therefore when branch predictions of addresses of previous 1st and 2nd instruction fetches from the instruction fetch of the branch prediction target instruction are branch-taken, the instruction fetch of the branch prediction target instruction is cancelled thereafter.

That is, in this embodiment, even if the address of the instruction fetch before the cycles for adding the weights obtained from the branch weight tables together is not used for the branch prediction, all the branch predictions that became branch-taken in the past are reflected in the instruction fetch of the branch prediction target instruction. Compared to the branch prediction as branch-not-taken of the past, the prediction result of branch-taken of the past has a large degree of influence on the branch prediction accuracy of the branch prediction target instruction, and therefore it is possible to suppress the degree of influence on the branch prediction accuracy even without using the address of the instruction fetch before the cycles for the addition of the weights obtained from the branch weight tables together for the branch prediction.

In the branch prediction processing in the first embodiment, as illustrated in FIG. 5, the IFCH base path history 411 is introduced, where instruction fetch addresses and branch prediction results equivalent to the length of the global history before the instruction fetch of the branch prediction target instruction are stored. The IFCH base path history 411 includes an address unit 411-1 where (some of) instruction fetch addresses are stored and a TAKEN storage unit 411-2 where information of branch-taken or branch-not-taken is stored.

The address unit 411-1 is configured to, every time an instruction fetch appears in the IA cycle, register its instruction fetch address therein and drive the old instruction fetch address out therefrom in chronological order. The TAKEN storage unit 411-2 is configured to, every time a branch prediction result is decided in the BM cycle, register the result therein and drive the old result out therefrom in chronological order. Based on these instruction fetch addresses (FAD<20> to FAD<2>), the branch weight tables (BWT20 to BWT2) are searched in a cycle T1 to obtain weights of instructions. The branch weight table (BWT1) is, when a previous 3rd instruction fetch from the instruction fetch of the branch prediction target instruction is performed, only searched with the instruction fetch address (FAD<1>) at that time, so that the instruction fetch address in the path history 411-1 is not used.

Further, the weight operation is used information indicating whether or not in the instructions obtained by instruction fetches in the past, the instruction predicted as branch-taken is included. The information is read out from the TAKEN storage unit 411-2 of the IFCH base path history to be used for the operation. As illustrated in FIG. 5, the cycle of the address unit 411-1 being read out from the path history and the cycle of the TAKEN storage unit 411-2 being read out from the path history are different. Pieces of information of the branch predictions as branch-taken or branch-not-taken corresponding to the weights obtained from the branch weight tables (BWT20 to BWT3) are decided in a cycle before the weight operation is started and are stored in the TAKEN storage unit 411-2 of the path history.

Therefore, the pieces of information of the branch predictions as branch-taken or branch-not-taken corresponding to the weights obtained from the branch weight tables (BWT20 to BWT3) are each read out from the path history 411-2 at the timing of a cycle T3 to be added together. Information of the branch prediction as branch-taken or branch-not-taken corresponding to the weight obtained from the branch weight table (BWT2) is decided at the timing of the cycle T3, so that the decided information of the branch prediction is used to perform the weight operation. Information of the branch prediction as branch-taken or branch-not-taken corresponding to the weight obtained from the branch weight table (BWT1) is decided in a cycle T4 next to the cycle in which the weight operation of the weights obtained from the branch weight tables (BTW20 to BWT2) is started. Therefore, only the addition of the weight obtained from the branch weight table (BWT1) is executed late by one cycle.

Here, the IFCH base path history 411 includes 20th and 2nd entries that store therein the instruction fetch addresses for searching the branch weight tables (BWT20 to BWT2). When it is predicted as branch-taken, false sequential instruction fetches are performed until it is decided to be branch-taken, resulting in that, also in the path history 411, information of the false instruction fetches is registered.

Thus, it is necessary to erase path histories corresponding to the false speculative instruction fetches that have been applied so far and return driven out entries back when it is decided to be branch-taken, so that entries that store therein the entries driven out from the 20th to 2nd entries of the path history 411-1 are needed. In the case of the example illustrated in FIG. 5, three cycles are taken from the instruction fetch until the branch prediction being decided, so that at most two sequential instruction fetches different from the branch prediction result are applied. In the path history 411-1 illustrated in FIG. 5, two entries (R1st and R2nd entries) for storing therein the entries driven out from the 20th to 2nd entries are provided.

Subsequently, there is explained an operation when branch prediction fails. In the case of the branch prediction failure, as described above, it is necessary to update the program counter to a correct branch destination address and restart an instruction fetch with a value of the correct branch destination address after the instruction that has failed in branch prediction is committed. Further, the operations running through the pipelines at this moment are being executed based on the false branch prediction, to thus be cleared.

When an instruction fetch is performed again with the correct branch destination, the IFCH base path history 411 is updated to a correct one. This is because the path history 411 constituted at the stage of an instruction refetch corresponds to the false branch prediction and the stage at which the instruction that has failed in branch prediction is committed and the stage of the instruction fetch are largely displaced. The IFCH base path history 411 is updated to information equivalent to 20 times instruction fetches before the instruction fetch of the instruction that has failed in the branch prediction before performing the instruction refetch and the instruction refetch is performed thereafter.

Therefore, the branch prediction mechanism 219 receives information related to commits of all the instructions from the commit stack entry 208 and creates also a commit base path history 412 therein. When a branch prediction failure occurs, the IFCH base path history 411 is replaced with the commit base path history 412, and after execution of an instruction refetch, branch prediction is performed by using the replaced path history. Information of a previous 20th instruction fetch line from the instruction refetch is written in the path history, resulting in that the branch prediction can be performed again with the correct path history even after the instruction refetch. The commit base path history 412 has the same constitution as that of the IFCH base path history 411. That is, addresses committed for each single fetch line and decision information indicating whether or not there is an instruction predicted as branch-taken in the fetch line enter one entry.

There is explained a concrete achieving method of the commit base path history 412. At the time of registering an instruction in the commit stack entry 208, information indicating that the boundary of a fetch line is the instruction itself is stored. When the instruction is committed, an entry is added to the commit base path history 412 and the oldest entry is driven out therefrom. In the entry, (a part of) an instruction fetch address of the committed instruction is stored as the address unit. Further, together with a commit report from the RSBR 207, information indicating whether a branch instruction is branch-taken or branch-not-taken also enters the commit stack entry 208. Based on the information, it is decided whether there is an instruction predicted as branch-taken among the instructions equivalent to the single fetch line corresponding to the entry in the commit base path history 412, and information of the decision is also registered in the commit base path history 412.

In the piecewise-linear branch prediction method, the branch weight table is updated every time the conditional branch instruction is committed. For example, in the case of branch-taken, +1 is set to the branch weight table, and in the case of branch-not-taken, −1 is set to the branch weight table. In this embodiment, the global history is provided with each fetch line, so that the branch weight table is updated every time the fetch line is exceeded. There is explained a mechanism of the table update in the first embodiment below.

When an instruction exceeding the fetch line is committed, the commit base path history 412 is updated and in the case where a conditional branch instruction is included in the fetch line, the path history before being updated is used to update respective weights. When the instruction exceeding the fetch line is committed, using an address of the fetch line including the own instructions to be committed, the branch weight table (BWT0) is updated.

When the conditional branch instruction is included in the fetch line and is predicted as branch-taken, 1 is added, and when the conditional branch instruction is included and is predicted as branch-not-taken, 1 is subtracted. As long as no conditional branch instruction is included in the fetch line, the weight update is not performed. The branch weight table (BWT1) is a weight corresponding to one previous fetch line. Therefore, for an update of the branch weight table (BWT1), the 1st address in the commit base path history 412 and the information of branch prediction are used. Similarly, for the branch weight table (BWT20), the 20th address in the commit base path history 412 and the information of branch prediction are used.

Figure 6:
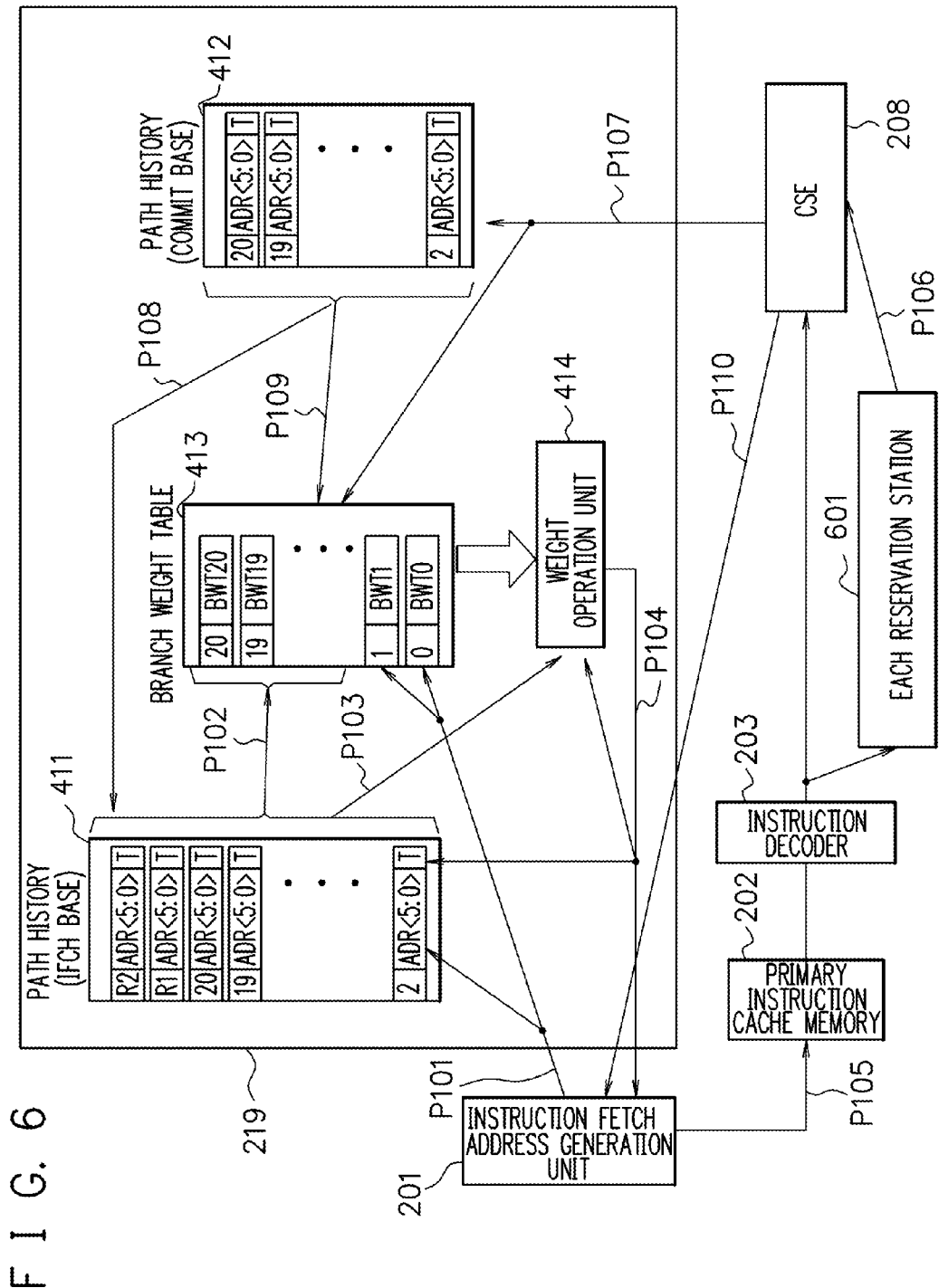
FIG. 6 is a diagram illustrating correlations between respective blocks related to branch prediction in the first embodiment.

FIG. 6 illustrates correlations between respective blocks related to the branch prediction in the first embodiment. The instruction fetch address generation unit 201 decides an instruction fetch address in the IA cycle to send the decided instruction fetch address to the branch prediction mechanism 219 (P101). In the branch prediction mechanism 219, the branch weight table 413 is searched in order to perform branch prediction corresponding to the instruction fetch address. At the same time, the branch weight table (BWT1) is also searched in order to perform branch prediction corresponding to a subsequent 3rd instruction fetch address. Further, in order to perform branch predictions corresponding to instruction fetch addresses to follow thereafter, a part of the decided instruction fetch address is registered in the 2nd entry of the IFCH base path history 411. Thereafter, every time an instruction fetch is performed, the address unit of the IFCH base path history 411 is updated and the oldest one is driven out therefrom.

In order to, at the time of the instruction fetch, perform branch prediction with respect to a fetch line of the instruction fetch, the branch weight table 413 is searched to obtain weights before several cycles (P102). The addresses used for searching the branch weight table 413 are addresses of corresponding past fetch lines and are fetched from the address unit of the IFCH base path history 411. The weights of the respective searched branch weight tables are calculated in the weight operation unit 414 together with pieces of branch prediction information (P103) of the corresponding past respective fetch lines to be a branch prediction result (P104).

The branch prediction result is sent to the instruction fetch address generation unit 201, and when it is predicted as branch-taken, the branch destination address is employed as an instruction fetch address. The branch prediction result is used again for calculation for branch prediction of a subsequent 3rd fetch line, and for further subsequent branch prediction, the branch prediction result is registered in the TAKEN storage unit of the IFCH base path history 411.

An instruction fetch address sent from the instruction fetch address generation unit 201 is used for instruction fetches (P105), and an instruction fetched from the primary instruction cache memory 202 is decoded in the instruction decoder 203 to be registered in each of the reservation stations 601 for each instruction kind. The instruction decoded in the instruction decoder 203 is registered in the commit stack entry 208 to wait for committing instruction (P106).

Information of the committed instruction is used for an update of the commit base path history 412 (P107). The commit base path history 412 and the information of the committed instruction are used for an update of the branch weight tables (P109). When branch prediction fails, the IFCH base path history 411 is replaced with the information of the commit base path history 412 (P108), and after the replacement, by a direction from the commit stack entry 208, an instruction is fetched again from a correct branch destination address using a value of the updated program counter (P110).

(Second Embodiment)

Next, there is explained a second embodiment.

FIG. 7 is a diagram illustrating a configuration example of a processor in the second embodiment. In FIG. 7, the same symbols are added to components having the same functions as those of the components illustrated in FIG. 2, and redundant explanations are omitted.

In the first embodiment, an instruction refetch is not executed until the instruction that has failed in branch prediction becomes the top of queue of a commit processing wait instruction in the commit stack entry 208 to be committed. In this case, if there is an instruction that takes a lot of time for processing and does not affect decision of branch prediction before a branch instruction, there is considered a case that an instruction refetch is not sent even though the branch prediction failure is decided. The decision of the branch prediction failure is already found at the stage when the completion report of the branch instruction is sent to the commit stack entry 208 from the RSBR 207, and when it is possible to send a direction of the instruction refetch at the same time as the completion report is sent to the commit stack entry 208, a stall can be reduced.

The processor in the second embodiment illustrated in FIG. 7 has an instruction refetch address path to the instruction fetch address generation unit 201 from the RSBR 207 added thereto compared to the processor in the first embodiment illustrated in FIG. 2. However, the path to the instruction fetch address generation unit 201 from the program counter also remains because an instruction refetch is performed based on the program counter when a trap or the like occurs. Further, an update of the branch prediction mechanism 219 is performed in a complete base of a branch instruction, so that the branch prediction mechanism 219 is updated using information CMD not from the commit stack entry 208 but from the RSBR 207.

The constitution related to the instruction fetch can be constituted in the same manner as in the first embodiment. Even in the second embodiment, when branch prediction fails, the IFCH base path history 411 is replaced similarly to the first embodiment. However, in the second embodiment, it is difficult to prepare a table for the path history replacement compared to the first embodiment.

In the second embodiment, information called sequential counter (SEQ_CTR) is introduced. This information indicates, at the time of registering instructions in the RSBR 207 from the instruction decoder 203, after how many fetch lines each branch instruction has entered the RSBR 207 in a manner corresponding to each branch instruction. Instruction fetch addresses proceed sequentially in processing other than the processing by a branch instruction, and therefore with a value of the sequential counter, a path history can be created also for instructions in a fetch line performed between branch instructions in the complete base of a branch instruction.

There is concretely explained an achieving method of the sequential counter. A sequential counter is prepared in the instruction decoder 203, and every time an instruction on the boundary of a fetch line is issued, the counter is counted up. And every time a branch instruction is issued, a value of the sequential counter at this time is sent to the RSBR 207 in a manner to be attached to the branch instruction to be registered in an entry in the RSBR 207, and a count value of the sequential counter is set to 0. When a branch prediction failure occurs, the value of the sequential counter at the time when the branch prediction failure is decided results in a value based on the false branch prediction, to thus be cleared. Thereafter, when a correct instruction is fetched by an instruction refetch, the sequential counter restarts a count operation.

When the completion report of the branch instruction is sent to the commit stack entry 208 from the RSBR 207, information of the completed instruction is sent also to the branch prediction mechanism 219. The branch prediction mechanism 219, upon receipt of the information, creates a complete base path history. At this time, an entry for the value of the sequential counter attached to the completed branch instruction is created in the complete base path history, and the oldest entry is driven out therefrom correspondingly. Thereby, a path history for each fetch line can be created in such a manner as it is created in the commit base in the first embodiment.

Figure 8:
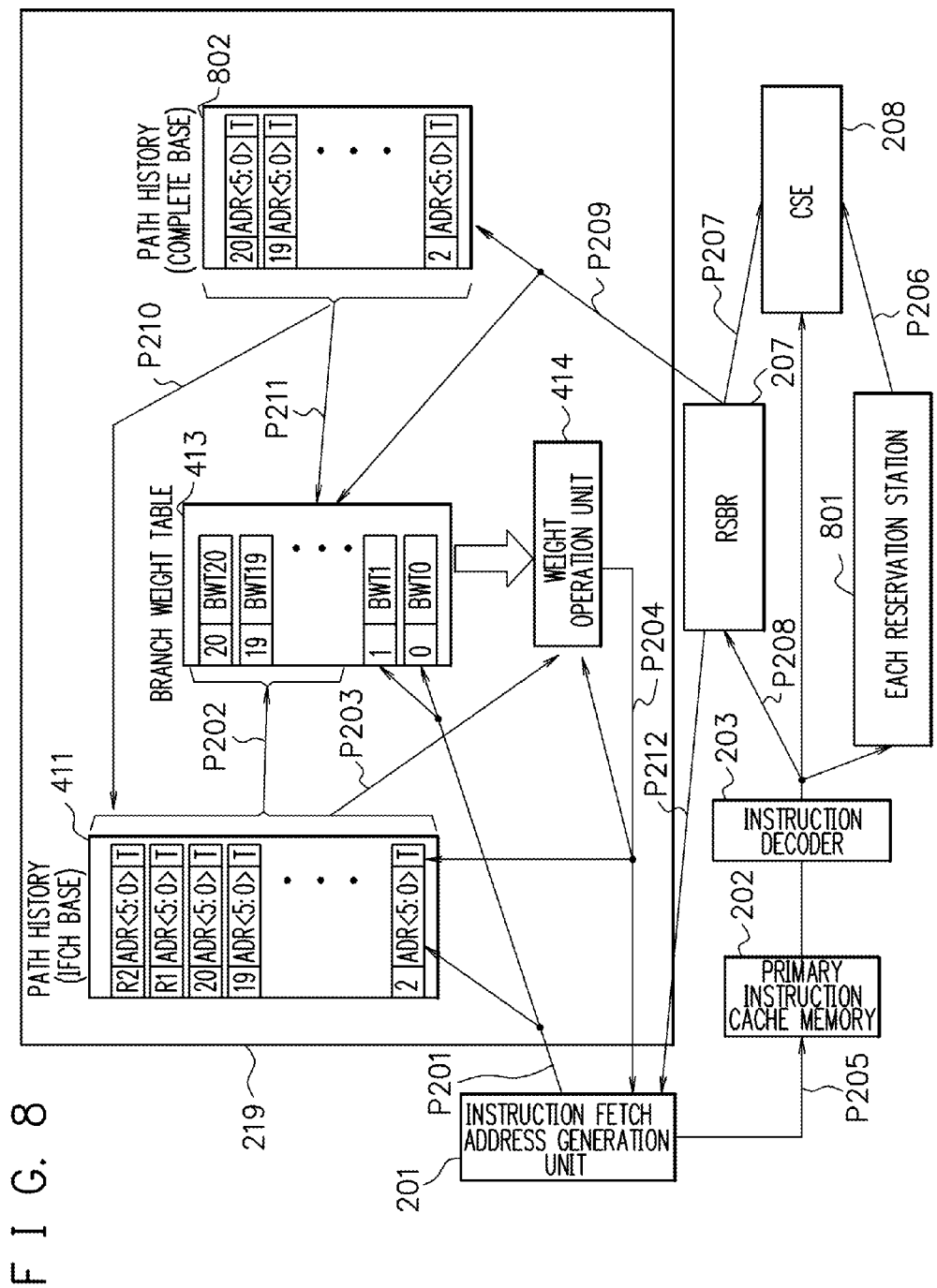
FIG. 8 is a diagram illustrating correlations between respective blocks related to branch prediction in the second embodiment.

FIG. 8 illustrates correlations between respective blocks related to the branch prediction in the second embodiment. The instruction fetch address generation unit 201 decides an instruction fetch address in the IA cycle to send the decided instruction fetch address to the branch prediction mechanism 219 (P201). In the branch prediction mechanism 219, the branch weight table 413 is searched in order to perform branch prediction corresponding to the instruction fetch address. At the same time, the branch weight table (BWT1) is also searched in order to perform branch prediction corresponding to a subsequent 3rd instruction fetch address. Further, in order to perform branch predictions corresponding to instruction fetch addresses to follow thereafter, a part of the decided instruction fetch address is registered in the 2nd entry of the IFCH base path history 411. Thereafter, every time an instruction fetch is performed, the address unit of the IFCH base path history 411 is updated and the oldest one is driven out therefrom.

In order to, at the time of the instruction fetch, perform branch prediction with respect to a fetch line of the instruction fetch, the branch weight table 413 is searched to obtain weights before several cycles (P202). The addresses used for searching the branch weight table 413 are addresses of corresponding past fetch lines and are fetched from the address unit of the IFCH base path history 411. The weights of the respective searched branch weight tables are calculated in the weight operation unit 414 together with pieces of branch prediction information (P203) of the corresponding past respective fetch lines to be a branch prediction result (P204).

The branch prediction result is sent to the instruction fetch address generation unit 201, and when it is predicted as branch-taken, the branch destination address is employed as an instruction fetch address. The branch prediction result is used again for calculation for branch prediction of a subsequent 3rd fetch line, and for further subsequent branch prediction, the branch prediction result is registered in the TAKEN storage unit of the IFCH base path history 411.

An instruction fetch address sent from the instruction fetch address generation unit 201 is used for instruction fetches (P205), and an instruction fetched from the primary instruction cache memory 202 is decoded in the instruction decoder 203 to be registered in each reservation station 801 for each instruction kind. The instruction decoded in the instruction decoder 203 is registered in the commit stack entry 208 to wait for committing instruction (P206, P207). The branch instruction is registered in the RSBR 207. At the same time, the value of the sequential counter is also registered in the RSBR 207 in a manner to be attached to the branch instruction (P208).

Information of the completed branch instruction including the value of the sequential counter is used for an update of the complete base path history 802 (P209). The complete base path history 802 and the information of the completed branch instruction are used for an update of the branch weight tables (P211). Further, when branch prediction fails, the IFCH base path history 411 is replaced with the information of the complete base path history 802 (P210), and after the replacement, by a direction from the RSBR 207, an instruction is fetched again from a correct branch destination address (P212).

Note that the above-described embodiments merely illustrate a concrete example of implementing the present invention, and the technical scope of the present invention is not to be construed in a restrictive manner by the embodiments. That is, the present invention may be implemented in various forms without departing from the technical spirit or main features thereof.

In one aspect, it is possible to reduce a latency of branch prediction from an instruction fetch of a branch prediction target instruction till obtaining a result of branch prediction and reduce storage circuits for propagating an intermediate result of a weight product-sum operation. Accordingly, it becomes possible to suppress increases in the circuit amount and in the latency of branch prediction and fabricate a branch prediction mechanism having a high prediction accuracy of branch prediction.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A processor comprising:
   an instruction execution unit that executes an instruction;
   a branch prediction unit that stores history information and weight tables including weights corresponding to instructions, before an instruction fetch of a branch prediction target instruction is performed, obtains the history information and the weights related to instruction fetches performed a certain number of times before the instruction fetch of the branch prediction target instruction, performs a weight product-sum operation using the obtained history information and weights, and at the time of the instruction fetch of the branch prediction target instruction, performs an operation of a result obtained by the weight product-sum operation and a weight of the branch prediction target instruction, and predicts the branch prediction target instruction to be branch-taken or branch-not-taken, the history information indicating every instruction fetch performed the certain number of times whether the instruction predicted as branch-taken is included, and the weight tables including the weights to be obtained by search using indexes based on addresses of the instruction fetches.

2. The processor according to claim 1, wherein the branch prediction unit, before cycles taken for the weight product-sum operation using the history information and the weights related to the instruction fetches performed the certain number of times rather than performing the instruction fetch of the branch prediction target instruction, obtains the history information and the weights and starts the weight product-sum operation.

3. The processor according to claim 2, wherein the branch prediction unit holds, as a path history, addresses of instruction fetches between an instruction fetch performed before the cycles taken for the weight product-sum operation using the history information and the weights related to the instruction fetches performed the certain number of times rather than the instruction fetch of the branch prediction target instruction and the instruction fetch performed before the certain number of times.

4. The processor according to claim 3, wherein the branch prediction unit stores addresses of instruction fetches equivalent to the number of the cycles between the instruction fetch performed before the cycles taken for the weight product-sum operation using the history information and the weights related to the instruction fetches performed the certain number of times performed further before the instruction fetches performed the certain number of times, and when the branch prediction target instruction is predicted as branch-taken, returns the addresses of the instruction fetches equivalent to the number of the cycles performed further before the instruction fetches performed the certain number of times to the path history and removes the addresses of the instruction fetches equivalent to the number of the cycles performed before the instruction fetch of the branch prediction target instruction from the path history.

5. The processor according to claim 1, wherein the branch prediction unit further creates an instruction path history based on addresses of committed instructions or a branch instruction path history based on addresses of completed branch instructions and stores the instruction path history or the branch instruction path history, and when a new instruction fetch is needed due to a prediction failure of a branch instruction, replaces a path history related to the addresses of the instruction fetches with either the stored instruction path history or branch instruction path history, and after execution of the new instruction fetch, performs branch prediction using either the replaced instruction path history or branch instruction path history.

6. The processor according to claim 5, further comprising:
   a branch reservation station that registers therein one or more branch instructions, wherein
   the branch prediction unit creates the branch instruction path history based on information indicating every how many fetch lines a branch instruction is registered in the branch reservation station.

7. A control method of a processor including an instruction execution unit that executes an instruction and a branch prediction unit that predicts a branch prediction target instruction to be branch-taken or branch-not-taken, the control method comprising:
- before performing an instruction fetch of the branch prediction target instruction, by the branch prediction unit, obtaining history information and weights related to instruction fetches performed a certain number of times before the instruction fetch of the branch prediction target instruction and performing a weight product-sum operation using the obtained history information and weights, wherein the branch prediction unit stores the history information indicating every instruction fetch performed the certain number of times whether the instruction predicted as branch-taken is included and weight tables including the weights corresponding to instructions to be obtained by search using indexes based on addresses of the instruction fetches; and
- at the time of the instruction fetch of the branch prediction target instruction, by the branch prediction unit, performing an operation of a result obtained by the weight product-sum operation and a weight of the branch prediction target instruction and performing branch prediction of the branch prediction target instruction.

\* \* \* \* \*